(12) United States Patent
Fukushima (10) Patent No.: US 10,027,833 B2
(45) Date of Patent: Jul. 17, 2018

(54) IMAGE READING APPARATUS AND IMAGE FORMING APPARATUS

(71) Applicant: CANON KABUSHIKI KAISHA, Tokyo (JP)

(72) Inventor: Takayuki Fukushima, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/589,347

(22) Filed: May 8, 2017

(65) Prior Publication Data

US 2017/0339294 A1    Nov. 23, 2017

(30) Foreign Application Priority Data

May 20, 2016   (JP) ................. 2016-101054

(51) Int. Cl.
```
H04N 1/04      (2006.01)
H04N 1/00      (2006.01)
H04N 1/10      (2006.01)
G03G 15/32     (2006.01)
```

(52) U.S. Cl.
CPC ....... *H04N 1/00809* (2013.01); *G03G 15/326* (2013.01); *H04N 1/0079* (2013.01); *H04N 1/00591* (2013.01); *H04N 1/00602* (2013.01); *H04N 1/00718* (2013.01); *H04N 1/00737* (2013.01); *H04N 1/00774* (2013.01); *H04N 1/1043* (2013.01); *H04N 2201/0081* (2013.01); (Continued)

(58) Field of Classification Search
CPC ............... B65H 3/0684; B65H 5/06; B65H 2301/33312; B65H 2402/441; B65H 2404/693; B65H 5/38; H04N 1/00588; H04N 1/00602; H04N 1/00694; H04N 1/0032; H04N 1/00411; H04N 1/00551; H04N 1/00732; H04N 1/00
USPC ........ 271/220, 3.19, 147, 171, 18, 214, 110, 271/114, 117, 160, 161, 162, 19, 209, 271/225, 227, 228, 254, 262, 265.01, 298, 271/303, 306, 3.14, 3.18, 4.1, 90; 358/474, 1.12; 399/258, 335, 124, 21, 399/329, 367, 393, 398, 405, 407, 46, 69
See application file for complete search history.

(56) References Cited

U.S. PATENT DOCUMENTS 6,349,155 B1    2/2002  Youda et al. ................. 382/312
7,984,901 B2 *  7/2011  Ohno ....................... B65H 1/14
                                                  271/145

(Continued)

FOREIGN PATENT DOCUMENTS

JP         2012-070126         4/2012

*Primary Examiner* — Negussie Worku
(74) *Attorney, Agent, or Firm* — Fitzpatrick, Cella, Harper & Scinto (57) ABSTRACT

An image reading apparatus including a reading unit comprising a photodetector configured to read an image information on a sheet, and a projecting portion, a case storing the photodetector therein, the case comprising a transparent portion configured to transmit light to be received by the photodetector, and a portion defining an opening through which the projecting portion is projected outward from the case, and an elastic portion provided to fill a space where the projecting portion is not present in the opening. The case movably stores the photodetector within a range where the projecting portion is movable in the opening.

18 Claims, 11 Drawing Sheets

(52) U.S. Cl.
CPC ............... *H04N 2201/0442* (2013.01); *H04N 2201/04703* (2013.01); *H04N 2201/04755* (2013.01)

(56) References Cited

U.S. PATENT DOCUMENTS

| | | | | |
|---|---|---|---|---|
| 8,366,101 | B2* | 2/2013 | Morita | B65H 3/0607 |
| | | | | 271/105 |
| 8,493,640 | B2* | 7/2013 | Tamehira | H04N 1/123 |
| | | | | 358/474 |
| 8,496,352 | B2* | 7/2013 | Bartlett | G03B 21/204 |
| | | | | 362/231 |
| 8,585,043 | B2* | 11/2013 | Aoyama | B65H 1/266 |
| | | | | 271/145 |
| 9,145,276 | B2* | 9/2015 | Kasamatsu | B65H 7/20 |
| 9,641,717 | B2* | 5/2017 | Lee | H04N 1/121 |
| 9,796,542 | B2* | 10/2017 | Shiohara | B65H 3/0684 |
| 9,819,838 | B2* | 11/2017 | Hatayama | H04N 1/6075 |
| 2005/0088493 | A1* | 4/2005 | Koga | B41J 2/17509 |
| | | | | 347/85 |
| 2010/0165424 | A1* | 7/2010 | Maeda | H04N 1/1017 |
| | | | | 358/498 |
| 2013/0342876 | A1* | 12/2013 | Takahashi | H04N 1/401 |
| | | | | 358/448 |
| 2015/0281518 | A1* | 10/2015 | Yamada | H04N 1/00819 |
| | | | | 358/447 |
| 2017/0279979 | A1* | 9/2017 | Maeda | H04N 1/0071 |
| 2018/0086579 | A1* | 3/2018 | Andoh | B65H 5/062 |

* cited by examiner

PRIOR ART

IMAGE READING APPARATUS AND IMAGE FORMING APPARATUS

BACKGROUND OF THE INVENTION

Field of the Invention

The present invention relates to an image reading apparatus configured to read an image on a sheet, and an image forming apparatus equipped with the image reading apparatus.

Description of the Related Art

Heretofore, image forming apparatuses such as copying machines and facsimiles having image reading apparatuses configured to optically read images on documents are known. This type of image reading apparatus is equipped with an automatic document conveying apparatus (Auto Document Feeder, hereinafter referred to as ADF) configured to convey one sheet of document at a time, and a scanner unit configured to read the image on the document being conveyed through a platen glass.

If a foreign substance adheres to a surface of the platen glass, light emitted from the scanner unit is blocked by the foreign substance, and linear image noises (hereinafter referred to as "image streaks") may be formed on the image information being read. Examples of such foreign substances include paper dust generated from documents or shavings of conveyance rollers formed to convey documents. Therefore, an arrangement is known where platen glass is electrically grounded to relieve electrostatic attraction operating between the foreign substance and the platen glass, and a leading edge of the document being conveyed scrapes the foreign substance adhered to the platen glass to thereby clean the platen glass.

Meanwhile, some type of image reading apparatuses includes two scanner units corresponding to front and rear sides of the document, and image information is acquired from both sides of the document while the document is being conveyed once by the ADF. Even in such image reading apparatus, if foreign substances are adhered to the platen glass opposed to the rear side of the document, image streaks may occur to the image information being read.

Figure 11:
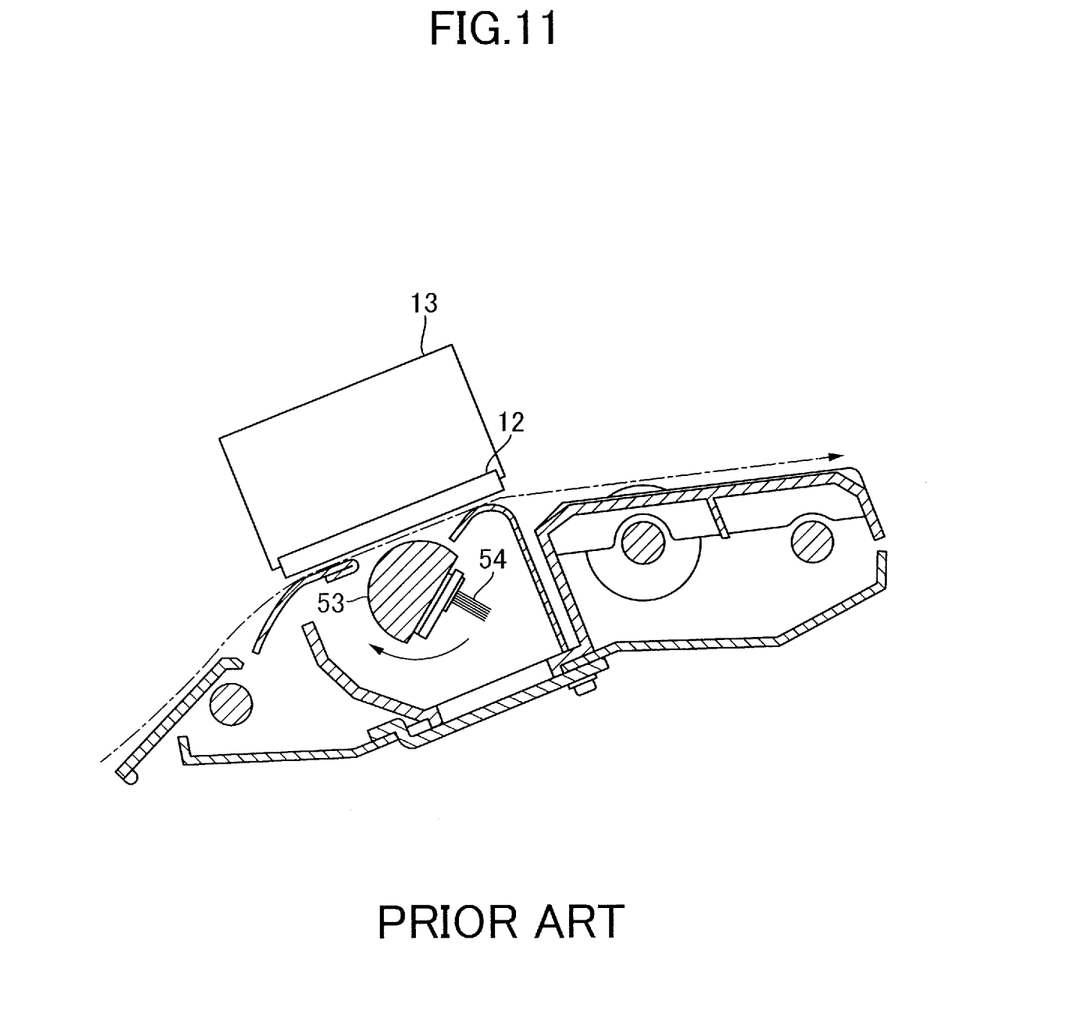
FIG. 11 is a cross-sectional side view illustrating a conventional image reading apparatus.

Therefore, Japanese Unexamined Patent Application Publication No. 2012-70126 proposes, as illustrated in FIG. 11, an image reading apparatus including a reading sensor 13 configured to read image information on a rear side of a document through a platen glass 12, and a shaft member 53 arranged to face the reading sensor 13 and equipped with a cleaning brush. According to the image reading apparatus, the shaft member 53 rotates to cause a cleaning brush 54 to clean foreign substances adhered to the platen glass 12, thereby preventing generation of image streaks.

However, the image reading apparatus taught in Japanese Unexamined Patent Application Publication No. 2012-70126 can remove the foreign substances adhered to a side, constituting the conveyance path, of the platen glass 12, but it cannot remove the foreign substances floating between the platen glass 12 and the reading sensor 13. Therefore, image streaks occur in a state where foreign substances enter between the platen glass 12 and the reading sensor 13, and there is fear that the document may not be read preferably.

Moreover, in order to read the image information of the document highly accurately, the document must be conveyed in a state where a leading edge of the document is in parallel with an image reading line of the reading sensor 13. However, there may be a case where the image reading line of the reading sensor 13 and the leading edge position of the document are deviated, due to intersection of components, for example, and in that case, it was necessary to adjust the position of the reading sensor 13.

SUMMARY OF THE INVENTION

According to a first aspect of the present invention, an image reading apparatus including a reading unit comprising a photodetector configured to read an image information on a sheet, and a projecting portion, a case storing the photodetector therein, the case comprising a transparent portion configured to transmit light to be received by the photodetector, and a portion defining an opening through which the projecting portion is projected outward from the case, and an elastic portion provided to fill a space where the projecting portion is not present in the opening. The case movably stores the photodetector within a range where the projecting portion is movable in the opening.

According to a second aspect of the present invention, an image reading apparatus including a reading unit configured to read an image information on a sheet, and a sealed unit configured to cover a periphery of the reading unit and seal the reading unit. The reading unit includes a projecting portion configured to project outward from the sealed unit. The sealed unit includes a transparent portion configured to transmit light directed toward the reading unit, and a deforming portion configured to maintain a sealed state of the sealed unit and deform so as to allow movement of the projecting portion.

Further features of the present invention will become apparent from the following description of exemplary embodiments with reference to the attached drawings.

DESCRIPTION OF THE EMBODIMENTS

First Embodiment

Now, an image reading apparatus and an image forming apparatus according to the present disclosure will be described with reference to the drawings. The dimensions, materials, shapes, relative arrangements and so on of components taught in the present embodiment are not intended to limit the scope of the present technique, unless stated otherwise.

Schematic Configuration of Printer

Figure 1:
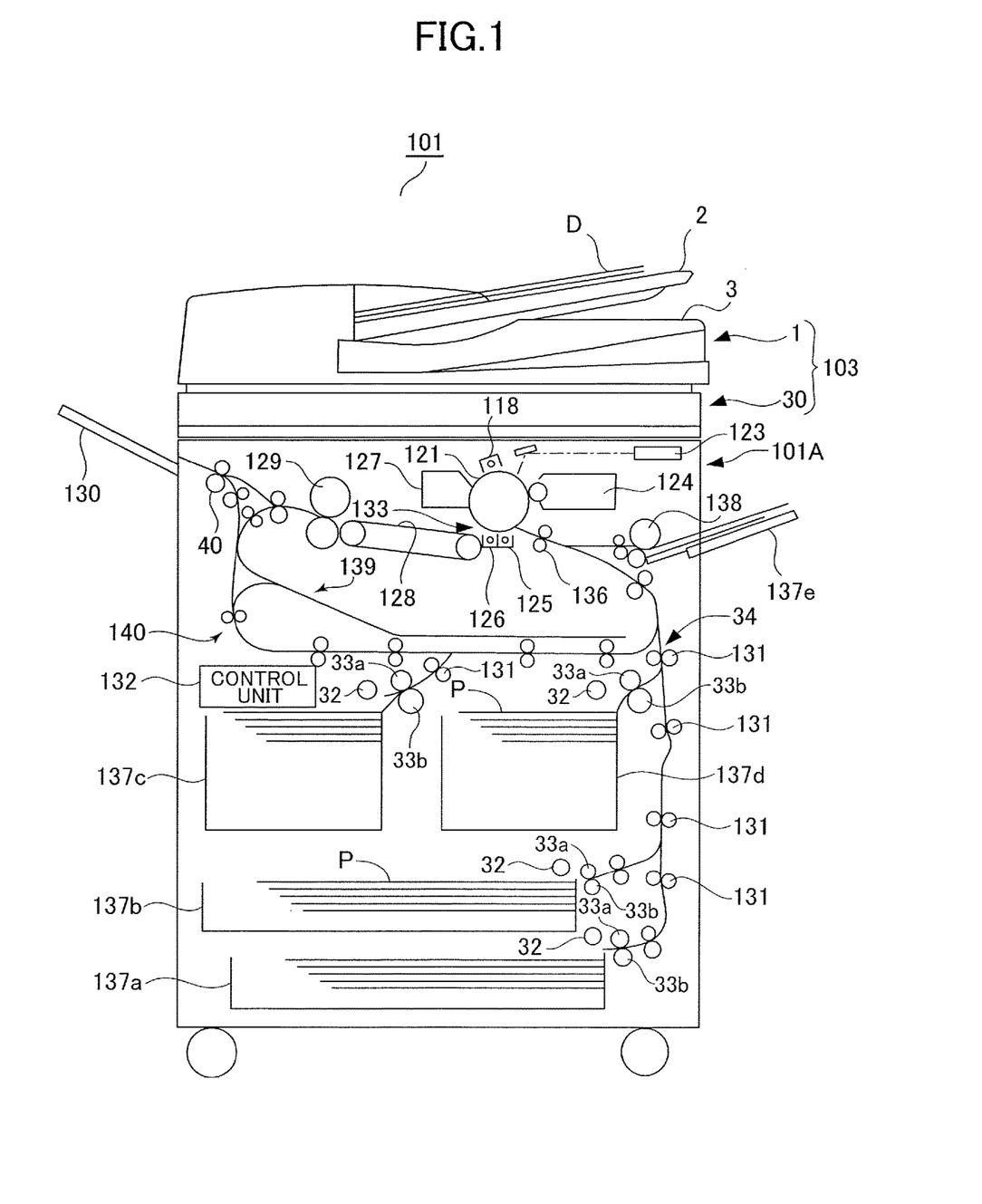
FIG. 1 is a general schematic view illustrating a printer according to a first embodiment.

First, a schematic configuration of a printer 101 serving as an image forming apparatus will be described with reference to FIG. 1. As illustrated in FIG. 1, the printer 101 includes a printer body 101A, and an image reading apparatus 103. The image reading apparatus 103 arranged above the printer body 101A includes an apparatus body 30 and an ADF 1, as described in detail later, and reads image information by optically scanning a document D. The document D is a sheet, such as a paper sheet or a paper envelope, a plastic film such as an OHP (overhead projector) sheet, or a cloth. The image information converted into electric signals by the image reading apparatus 103 is transferred to a control unit 132 provided on the printer body 101A.

The printer body 101A includes an image forming portion 133 configured to form an image on a sheet P serving as a recording medium, and a sheet feeding portion 34 configured to feed the sheet P to the image forming portion 133. The sheet feeding portion 34 comprises sheet storage portions 137a, 137b, 137c and 137d storing different sized sheets. The sheet stored in each sheet storage portion is sent out by a pickup roller 32, separated sheet by sheet by a feed roller 33a and a retard roller 33b, and transferred to a corresponding conveyance roller pair 131. Then, the sheet P is sequentially transferred to the plurality of conveyance roller pairs 131 arranged along a sheet conveyance path, and conveyed to a registration roller pair 136.

The sheet P placed on a manual feed tray 137e by the user is fed by a feed roller 138 to an inner side of the printer body 101A, and conveyed to the registration roller pair 136. The registration roller pair 136 stops a leading edge of the sheet P to correct skew feed, and resumes conveyance of the sheet P at a matched timing with the progression of image forming operation as a process of forming a toner image by the image forming portion 133.

An image forming portion 133 configured to form an image on a sheet P is an image forming unit of an electrophotographic system equipped with a photosensitive drum 121 serving as a photoconductor. The photosensitive drum 121 is rotatable along a direction of conveyance of the sheet P, and on the periphery of the photosensitive drum 121 are arranged a charger 118, an exposing unit 123, a developing unit 124, a transfer charger 125, a detach charger 126, and a cleaner 127. The charger 118 charges the surface of the photosensitive drum 121 uniformly, and the exposing unit 123 exposes the photosensitive drum 121 based on the image information entered from the image reading apparatus 103 or the like, thereby forming an electrostatic latent image on the drum.

The developing unit 124 stores a two-component developer containing toner and carrier, and develops the electrostatic latent image into a toner image by supplying charged toner to the photosensitive drum 121. The toner image supported on the photosensitive drum 121 is transferred to the sheet P conveyed from the registration roller pair 136 by a bias electric field formed by the transfer charger 125. The sheet P to which the toner image has been transferred is separated from the photosensitive drum 121 by bias electric field formed by a detach charger, and conveyed to a fixing unit 129 by a pre-fixing conveyance unit 128. Attachments such as transfer residual toner remaining on the photosensitive drum 121 without being transferred to the sheet P are removed by the cleaner 127, and the photosensitive drum 121 is prepared for the next image forming operation.

The sheet P conveyed to the fixing unit 129 is nipped by the roller pair and pressed while being heated, such that toner is melted and fixed, and the image is thereby fixed to the sheet. In a state where image output is completed, the sheet P onto which image has been fixed is discharged via a sheet discharge roller pair 40 onto a sheet discharge tray 130 projected outward from the printer body 101A. In order to form an image on a rear side of the sheet P in duplex printing, the sheet P having passed the fixing unit 129 enters a reverse portion 139 where the front and rear sides of the sheet P are reversed, and the sheet P is conveyed via a duplex conveyance portion 140 to the registration roller pair 136. The sheet P onto which image has been formed again by the image forming portion 133 is discharged to the sheet discharge tray 130.

Image Reading Apparatus

Figure 2:
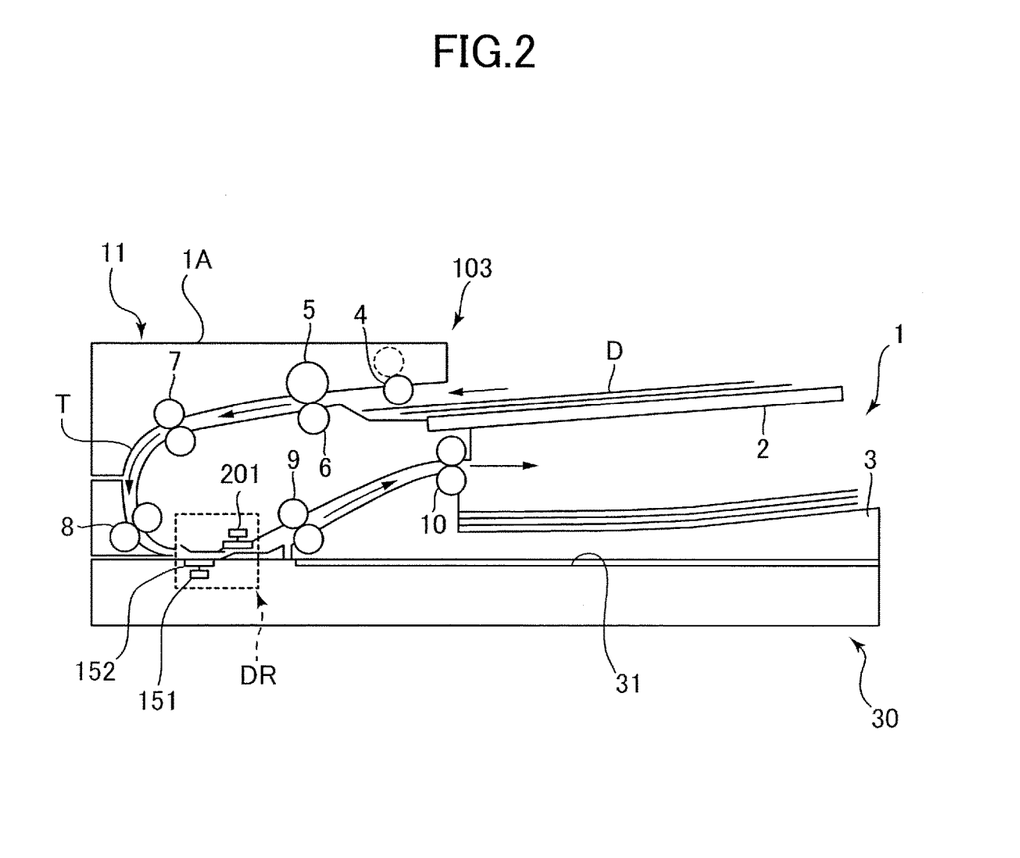
FIG. 2 is a side view illustrating an entire image reading apparatus.

Next, the configuration of the image reading apparatus 103 will be described with reference to FIG. 2. As illustrated in FIG. 2, the image reading apparatus 103 is composed of an image reading apparatus body (hereinafter simply referred to as "apparatus body") 30 serving as a body unit, and the ADF 1 serving as a sheet feed unit. Further, the image reading apparatus 103 includes a first reading unit 151 arranged on the apparatus body 30, and a second reading unit 201 arranged on the ADF 1. Now, the respective elements configuring the image reading apparatus 103 will be described.

The first reading unit 151 is an example of a reading portion configured to read image information from a first side of the document D. Further, the second reading unit 201 illustrates one example of a reading unit configured to read image information from a second side opposite from the first side of document D. The first side according to the present embodiment refers to a lower side of the document D in a duplex reading portion DR, and the second side refers to an upper side of the document D in the duplex reading portion DR. The first reading unit 151 and the second reading unit 201 constitute the duplex reading portion DR capable of reading both sides of the document D conveyed by the ADF 1 simultaneously. However, the duplex reading portion DR does not always read both sides of a document simultaneously, and it can also only one side of the document.

The first reading unit 151 and the second reading unit 201 are each formed of a contact image sensor (hereinafter referred to as CIS) serving as an unmagnified optical scanner. The first reading unit 151 and the second reading unit 201 are each equipped with an light source formed of an LED array arranged in a main scanning direction orthogonal to a conveyance direction of the document D, and a plurality of photodetectors 211 (refer to FIG. 5A, for example) also arranged in the main scanning direction. The light emitted from the LED array and reflected on the document D forms an image on each photodetector through a lens, and the image is subjected to photoelectric conversion by the photodetector.

The apparatus body 30 is fixed to an upper side of the printer body 101A (refer to FIG. 1). A flatbed-type document table 31 is arranged on an upper side of the apparatus body 30, as illustrated in FIG. 2. The first reading unit 151 is supported by a carriage (not shown) movable in left and right directions in the drawing, and the first reading unit 151 is movable from a predetermined position in the duplex reading portion DR, that is, position illustrated in the drawing, across an entire length of the document table 31 along the document table 31.

The ADF 1 is supported by a hinge mechanism not shown arranged on a depth side in the drawing, such that the ADF 1 is openable and closable in a vertical direction with respect to the apparatus body 30. The ADF 1 includes, in addition to the second reading unit 201, a document sheet feed tray 2, and a document conveyance portion 11. The document sheet feed tray 2 supports the document D placed thereon by a user. The document conveyance portion 11 has a document conveyance path T formed therein, and the document D placed on the document sheet feed tray 2 is fed through the document conveyance path T to the duplex reading portion DR.

Next, the document conveyance portion 11 will be described in detail. The document conveyance portion 11 includes a pickup roller 4, a feed roller 5, a retard roller 6, a registration roller pair 7, conveyance roller pairs 8 and 9, and a sheet discharge roller pair 10, arranged in the named order along a direction of conveyance of the document, serving as a sheet conveyance direction (illustrated by the arrow in the drawing). The pickup roller 4 is movable in a vertical direction with respect to the upper surface of the document sheet feed tray 2, and the pickup roller abuts against the document D on the document sheet feed tray 2 to start sheet feed. The feed roller 5 conveys the document D received from the pickup roller 4 downstream in the conveyance direction. The retard roller 6 is in pressure contact with the feed roller 5, and a rotary drive toward a direction opposite to the conveyance direction is entered to the retard roller 6 through a torque limiter, by which the document D conveyed by the feed roller 5 is separated sheet by sheet.

In a state where rotation of the registration roller pair 7 is stopped, the registration roller pair 7 receives a downstream end (hereinafter referred to as leading edge) of the document D in the conveyance direction conveyed by the feed roller 5, and the document D is warped to correct skewing. Further, the registration roller pair 7 conveys the skew-corrected document D through a bent portion of the document conveyance path T, and transfers the document D to the conveyance roller pair 8. The conveyance roller pair 8 sends the document D into the duplex reading portion DR, and transfers the document D to the conveyance roller pair 9 arranged downstream. At this time, the image on the document D is read by the first reading unit 151 and the second reading unit 201. The conveyance roller pair 9 transfers the document D having passed through the duplex reading portion DR to the sheet discharge roller pair 10. The sheet discharge roller pair 10 discharges the document D to a document discharge portion 3.

The image reading apparatus 103 having the above-described configuration reads image information from the document D by a feeding-reading mode in which a document image is scanned while the document D is fed by the ADF 1, and a fixed-reading mode in which a document placed on the document table 31 is scanned. The feeding-reading mode is selected in a state where the document D placed on the document sheet feed tray 2 is detected by the apparatus, or where there is a clear instruction from the user, for example, through use of an operation panel on the printer body 101A. In this case, in a state where the first reading unit 151 is in a predetermined position of the duplex reading portion DR, the ADF 1 feeds the document D one by one toward the duplex reading portion DR. In the case of simultaneous duplex reading operation, both the first reading unit 151 and the second reading unit 201 irradiate scanning light to the document D to perform scanning, and in the case of one-side reading operation, one of units 151 and 201 irradiates scanning light to the document D to perform scanning. The image information converted into electric signals by the photodetector is transferred to the control unit 132 of the printer body 101A.

Meanwhile, the fixed-reading mode is selected in a state where the document D placed on the document table 31 is detected by the apparatus, or where there is a clear instruction from the user, for example, through use of an operation panel on the printer body 101A. In this case, the first reading unit 151 moves along the document table 31 and irradiates light, and scans the document D placed on the document table 31. Then, the image information converted into electric signals by the photodetector of the first reading unit 151 is transferred to the control unit 132 of the printer body 101A.

Detailed Configuration of Duplex Reading Portion

Figure 3:
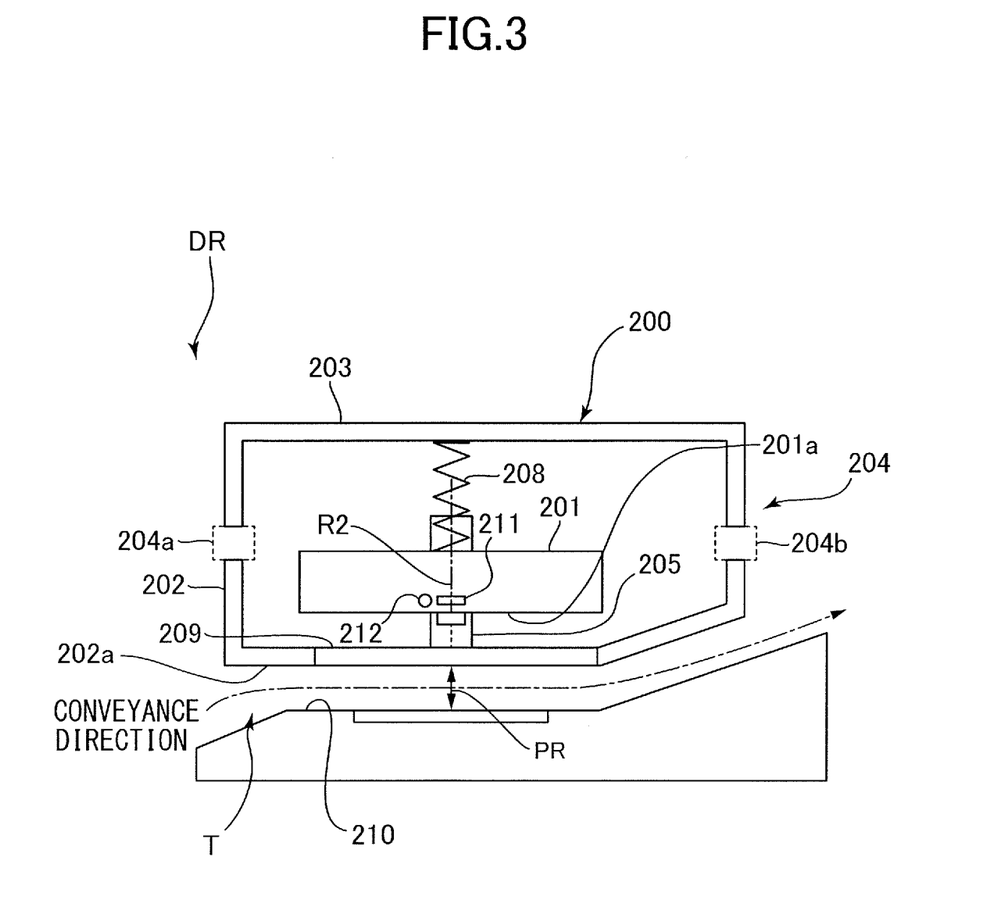
FIG. 3 is a side view illustrating a second reading unit and a sealed unit.

Next, the configuration of the duplex reading portion DR, especially the configuration for reading a second side of the document D, will be described. As illustrated in FIG. 3, the duplex reading portion DR includes a sealed unit 200 covering and sealing the second reading unit 201, and a conveyance guide 210 constituting a portion of the document conveyance path T. The second reading unit 201 includes a light emitting element 212 irradiating light to the document conveyed through the document conveyance path T, and a plurality of photodetectors 211 receiving the light reflected on the document, to thereby read the image information on the document.

A predetermined pressure in a perpendicular direction with respect to the sheet conveyance direction is applied to each roller pair configured to convey the document D, such that the document D is conveyed to the duplex reading portion DR. Therefore, in the process of conveying the document D, the surface of the document D is scraped by the rollers, and paper dust is generated. The generated paper dust floats inside the ADF 1. Depending on the environment in which the device is operated, dust may enter the inner side of the ADF 1. This dust is hereinafter referred to as "floating dust".

In a state where the floating dust floating in the inner side of the ADF 1 enters the gap between a reading surface 201a of the second reading unit 201 and a transparent portion 209 described later, the light emitted from the second reading unit 201 is blocked, and as a result, the read image may be a striped image. Further, since the second reading unit 201 is provided on the inner side of the ADF 1, it is difficult for the user to clean the space between the reading surface 201a of the second reading unit 201 and the transparent portion 209, and in some cases, it may be necessary to call a service person. Therefore, a configuration is required to prevent floating dust from entering the space between the second reading unit 201 and the transparent portion 209. In the present embodiment, the second reading unit 201 is sealed in the sealed unit 200 having the transparent portion 209, and floating dust is prevented from entering the space between the second reading unit 201 and the transparent portion 209. In the present embodiment, "sealed" refers to a state where a space is enclosed tightly such that foreign substances do not enter the space, but specifically, the configuration should be formed to prevent entry of floating particles such as dust having a size of 10 μm or greater.

Figures 4A, 4B:
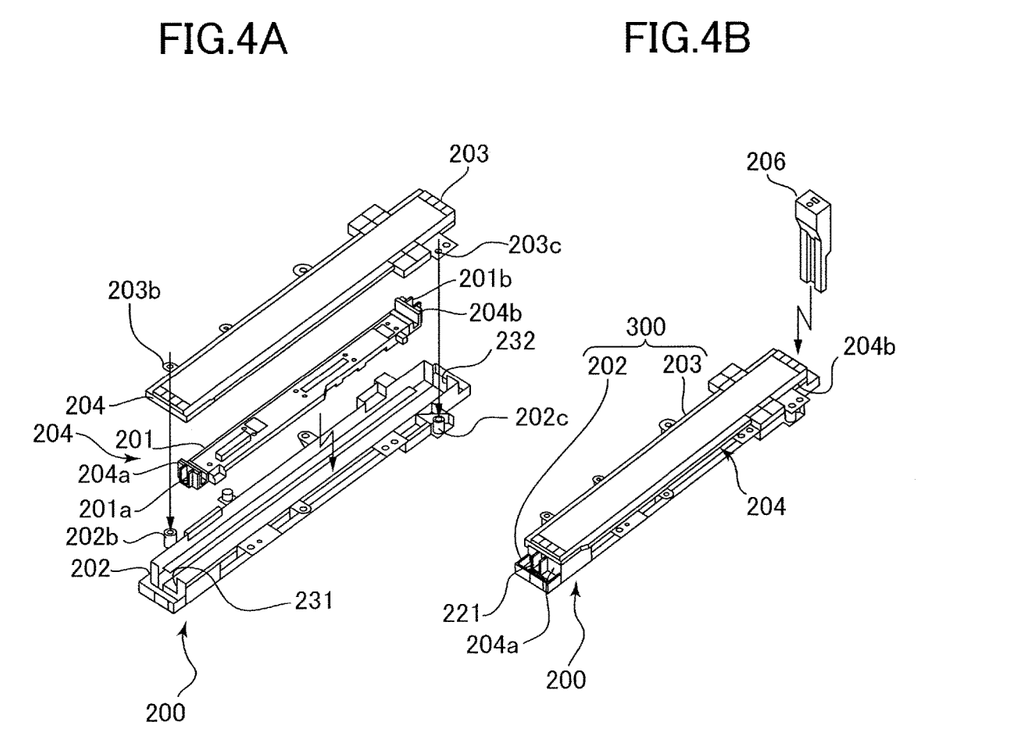
FIG. 4A is an exploded perspective view illustrating a sealed unit.
FIG. 4B is a perspective view illustrating the sealed unit and an adjusting lever.

As illustrated in FIGS. 3 and 4A, the sealed unit 200 includes a first case member 202 opposed to the conveyance guide 210, an elastic portion 204, and a second case member 203 covering and sealing at least the photodetectors 211 of the second reading unit 201 together with the first case member 202 via the elastic portion 204. The first case member 202 is supported on a casing 1A (refer to FIG. 2), serving as a supporting portion, of the ADF 1. The first case member 202 includes the transparent portion 209 opposed to the document D being conveyed and configured to transmit light emitted from a light source of the second reading unit 201, and a guide portion 202a constituting the document conveyance path T together with the transparent portion 209 and the conveyance guide 210. The first case member 202 and the second case member 203 are composed of a resin material such as polyacetal and polyamide. According to the present embodiment, the first case member 202 holds the transparent portion 209, but it is also possible to form the first case member 202 itself of a transparent material, such as transparent resin. The first case member 202 and the second case member 203 constitute a case 300 storing the second reading unit 201 therein.

The second case member 203 covers and seals the second reading unit 201 together with the first case member 202 via the elastic portion 204 serving as a deforming portion. The second case member 203 is arranged above the first case member 202 in a position superposed with the first case member 202 in planar view, and engagement portions 203b and 203c of the second case member 203 are fixed by screwing onto fixing portions 202b and 202c of the first case member 202.

A biasing member 208 serving as a biasing portion composed of a spring or the like configured to bias the second reading unit 201 toward the first case member 202 is provided between the second case member 203 and the second reading unit 201. The position in a gravity direction of the second reading unit 201 is determined by a biasing force of the biasing member 208, and a range of focus depth PR of the second reading unit 201 is configured to correspond to a height of the document conveyance path T. Thereby, a focus of the second reading unit 201 is set reliably to the document D being conveyed, and image reading accuracy is improved.

The elastic portion 204 is respectively composed of a first elastic member 204a and a second elastic member 204b, each formed in an L-shape, and the first elastic member 204a and the second elastic member 204b are arranged to form a rectangular shape and nipped by the first case member 202 and the second case member 203. That is, the elastic portion 204 is arranged along a whole circumference of the edges of the first case member 202 and the second case member 203. Further, the first elastic member 204a and the second elastic member 204b are formed of urethane-based foamed material, or foamed material formed of ethylene-propylene rubber, and the elastic members are arranged to fill the area where a sealed space could not be defined by the first case member 202 and the second case member 203. In a state where the sealed unit 200 seals the second reading unit 201, the elastic portion 204 is pressed by the first case member 202 and the second case member 203 alone. The elastic portion 204 can be arranged on both or on either one of the first case member 202 and the second case member 203. In the present embodiment, the elastic portion 204 is formed of two members, but it is possible to adopt a configuration where only one elastic member is used, or where three or more members are used.

Figure 5A:
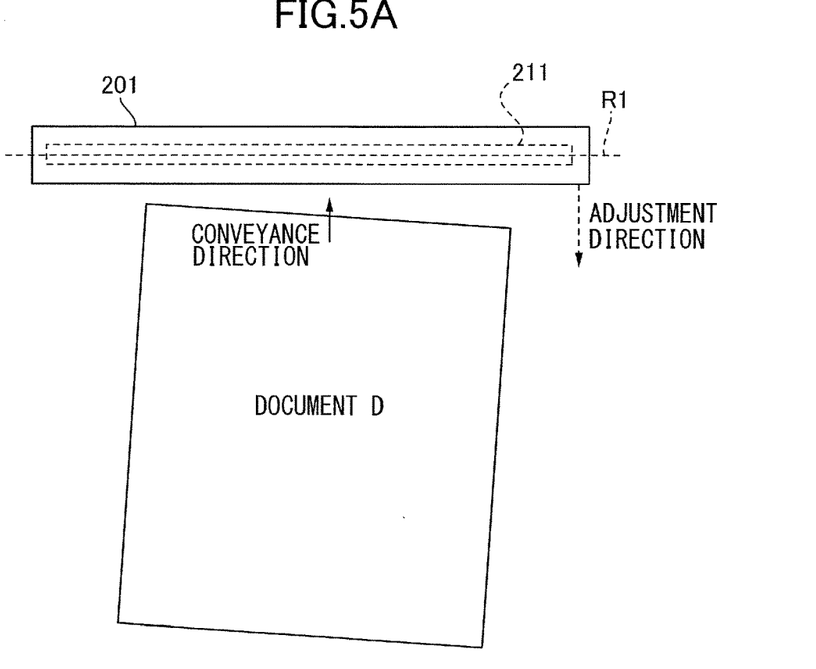
FIG. 5A is a plan view illustrating a state in which a skewed document is conveyed to a second reading unit.
Figure 5B:
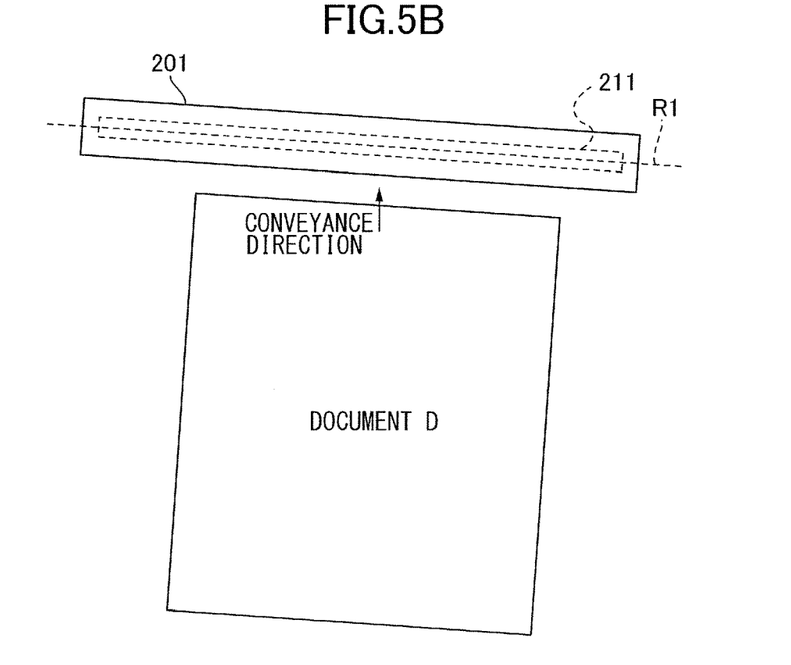
FIG. 5B is a plan view illustrating the second reading unit having been subjected to position adjustment, and the document.

As illustrated in FIG. 5A, the second reading unit 201 includes a plurality of photodetectors 211 built therein. The plurality of photodetectors 211 serving as the sensor array is arranged in a main scanning direction, that is, predetermined direction, orthogonal to the conveyance direction of the document D, and reads the image information of the document D on an image reading line R1 parallel to the main scanning direction. The image reading line R1 is an extended line in the main scanning direction of the photodetector 211.

Therefore, the document D must be conveyed in a state where the leading edge is parallel with the image reading line R1, but as illustrated in FIG. 5A, there are cases where the document D is skewed in the process of being conveyed to the duplex reading portion DR. Generally, the cause of skewing of the document D may be the difference in conveyance force of the conveyance roller pairs arranged along the main scanning direction, or the unevenness of the conveyance guide constituting the document conveyance path T, but the skewing of the document D is not only restricted to one sheet, and tends to continue in the subsequently conveyed documents. In that case, the position of the second reading unit 201 must be adjusted such that the leading edge of the document D being conveyed and the image reading line R1 of the second reading unit 201 are arranged in parallel while maintaining the sealed state of the second reading unit 201.

Configuration of Position Adjustment of Second Reading Unit

Figure 6:
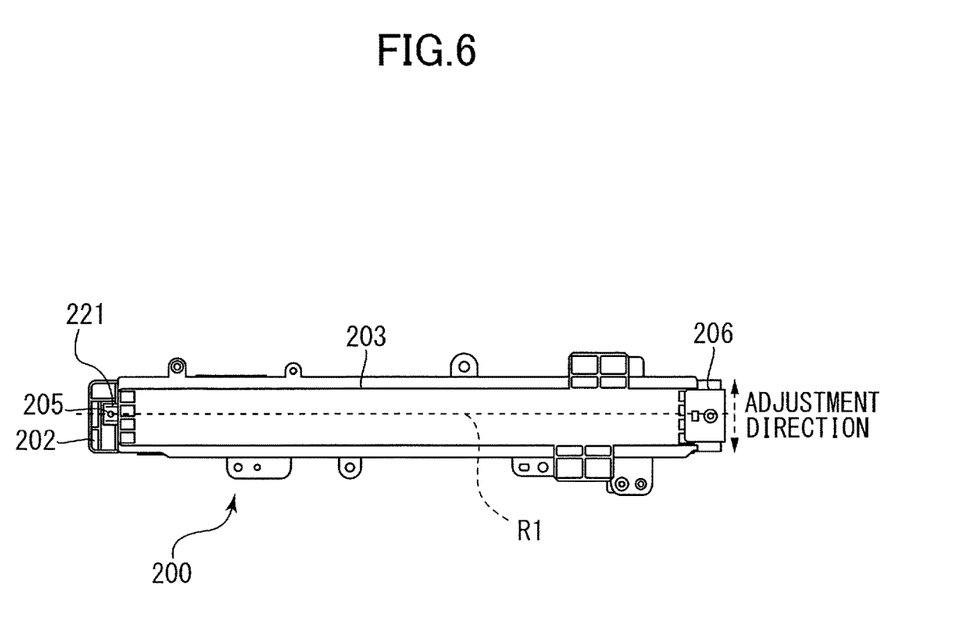
FIG. 6 is a plan view illustrating a sealed unit.
Figure 7:
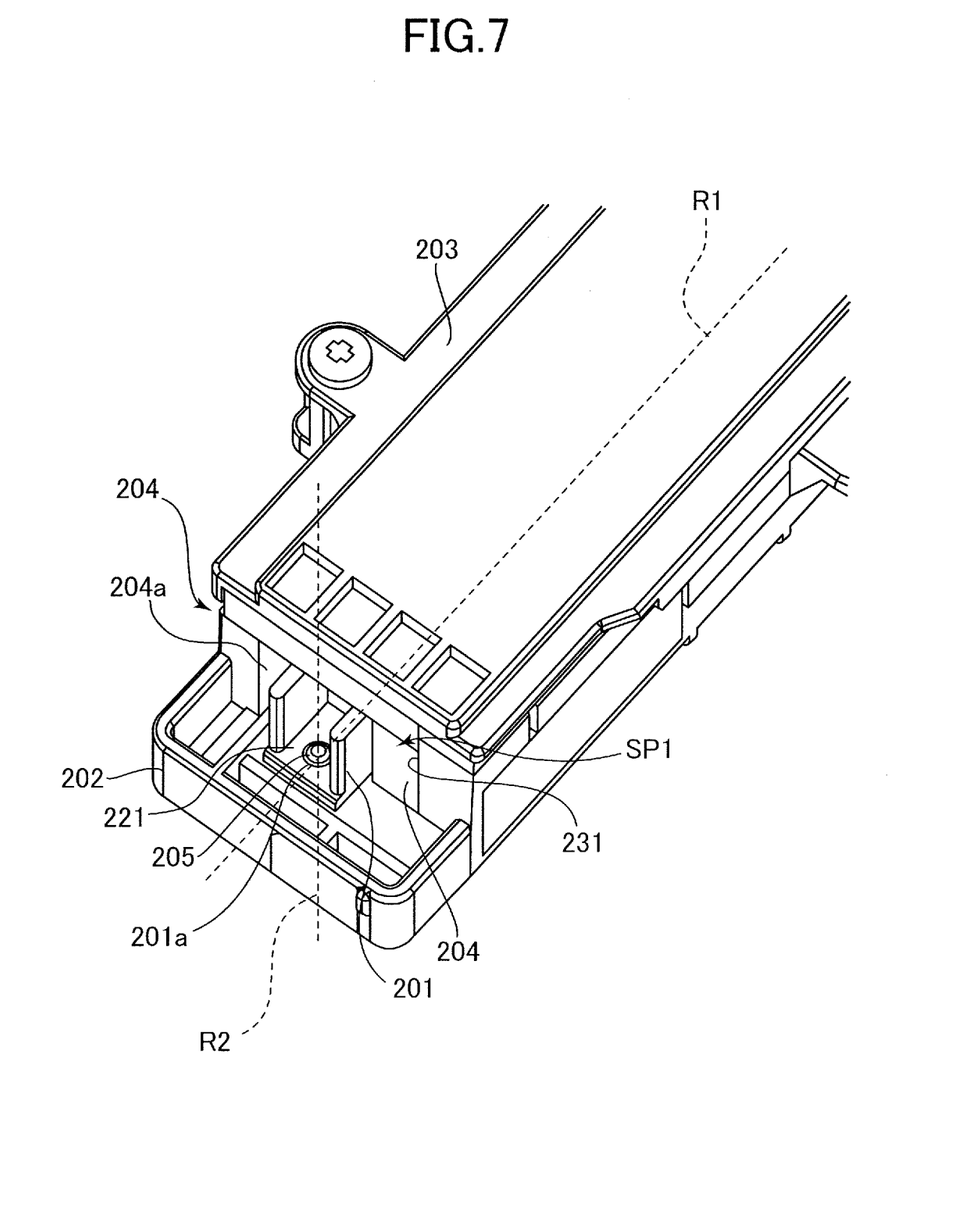
FIG. 7 is a perspective view illustrating a positional relationship between a center line of a shaft portion and an image reading line.

Next, the configuration for adjusting the position of the second reading unit 201 will be described. In the present embodiment, the first case member 202 includes the guide portion 202a, and the first case member 202 is designed unmovably to maintain an accurate gap between the conveyance guide 210 facing the guide portion 202a. Therefore, the position of the second reading unit 201 is designed adjustably while the first case member 202 is fixed. As illustrated in FIGS. 6 and 7, a shaft portion 205 configured to pivotably support the second reading unit 201 is formed on the first case member 202, as illustrated in FIGS. 6 and 7, and an engagement hole 201a configured to engage with the shaft portion 205 is formed on a first end 221 of the second reading unit 201. The second reading unit 201 is configured pivotably around the shaft portion 205 and the engagement hole 201a. An opening portion 231 as a first opening forming a space SP1 serving through which the first end 221 of the second reading unit 201 passes is formed on a first end of the first case member 202, and the first elastic member 204a is arranged in the space SP1 formed between the opening portion 231 and the first end 221 of the second reading unit 201.

Figure 8A:
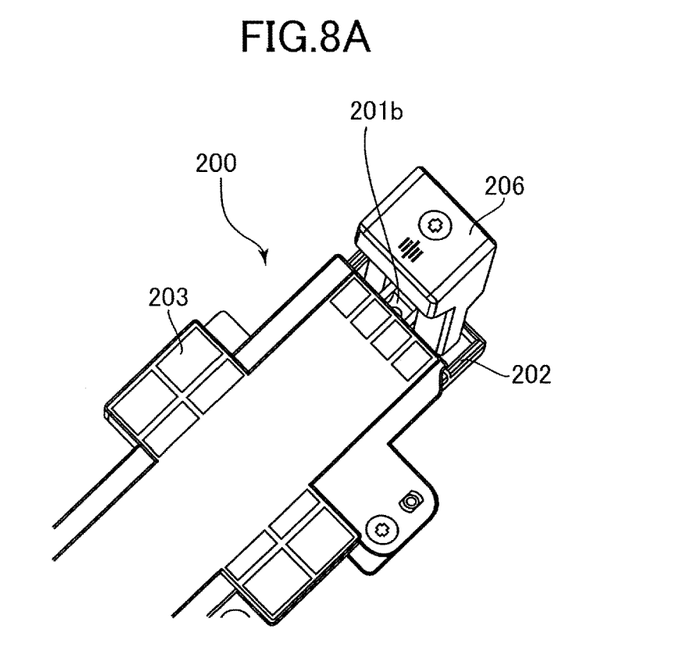
FIG. 8A is a perspective view illustrating a projecting portion of the second reading unit and the adjusting lever.
Figure 8B:
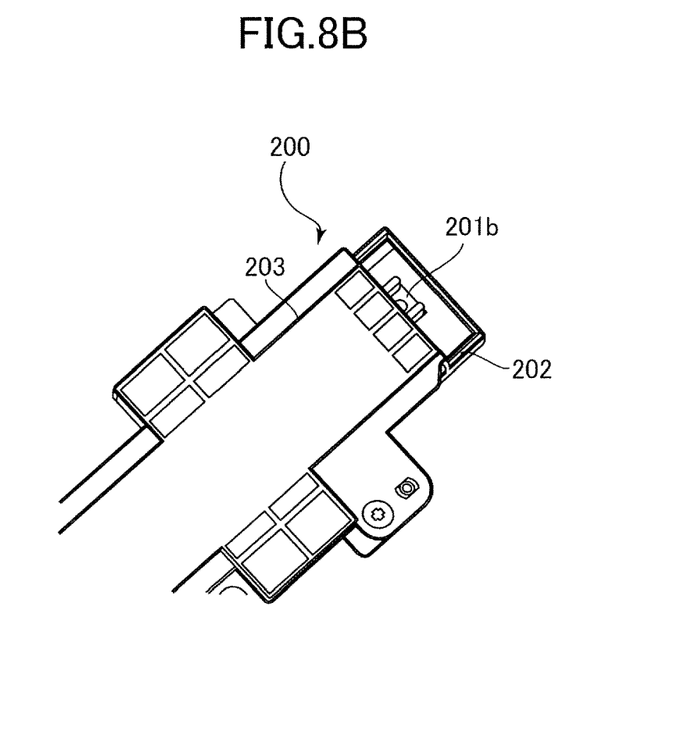
FIG. 8B is a perspective view illustrating a projecting portion of the second reading unit.

A projecting portion 201b configured to project outward from the sealed unit 200 is formed on a second end of the second reading unit 201 in the main scanning direction, as illustrated in FIG. 8B. Further, an opening portion 232 as a second opening defining an opening SP2 (refer to FIG. 9B) serving through which the projecting portion 201b of the second reading unit 201 passes to the outer side of the case 300 is formed on the second end of the first case member 202, as illustrated in FIGS. 4A and 9B. The second elastic member 204b is arranged in the opening SP2 formed between the opening portion 232 and the projecting portion 201b of the second reading unit 201. That is, the first elastic member 204a is arranged to fill the space SP1 and the second elastic member 204b is arranged to fill the space SP2. An adjusting lever 206 serving as an adjustment portion is engaged to the projecting portion 201b, as illustrated in FIG. 8A, and the user or the service person pivots the second reading unit 201 around the shaft portion 205 and the engagement hole 201a by operating the adjusting lever 206.

The adjusting lever 206 is engaged by a screw to the casing 1A (refer to FIG. 2) of the ADF 1 retaining the first case member 202 and the second case member 203 after the position adjustment of the second reading unit 201 is completed. Thus, the position of the second reading unit 201 is made adjustable. A center line R2 serving as a center of pivot of the shaft portion 205 and the engagement hole 201a is designed to intersect the image reading line R1, as illustrated in FIG. 7. In other words, the center line R2 of the shaft portion 205 and the engagement hole 201a is positioned on the image reading line R1. Therefore, the position adjustment of the second reading unit 201 can be completed easily by matching the adjustment angle of the second reading unit 201 with the skewed angle of the document D being conveyed. It is also possible to pivot the second reading unit 201 by directly operating the projecting portion 201b without using the adjustment lever 206, as illustrated in FIG. 8B.

Figure 9A:
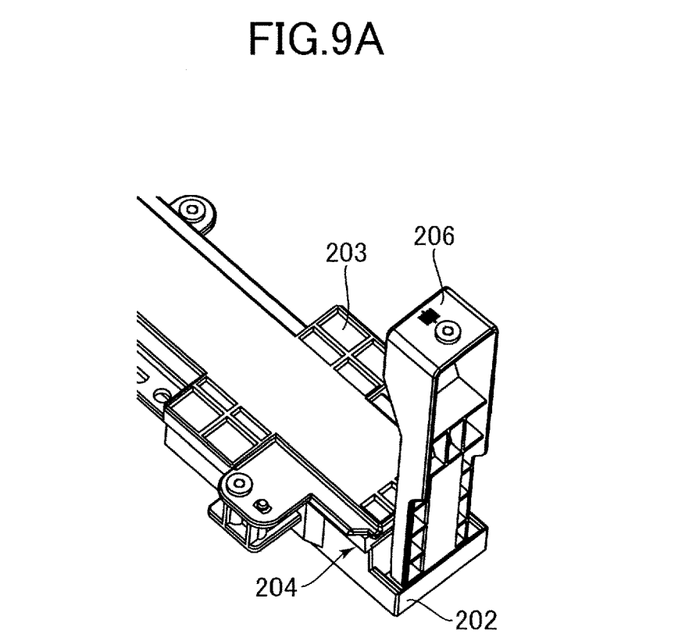
FIG. 9A is a perspective view illustrating the adjusting lever and an elastic member.
Figure 9B:
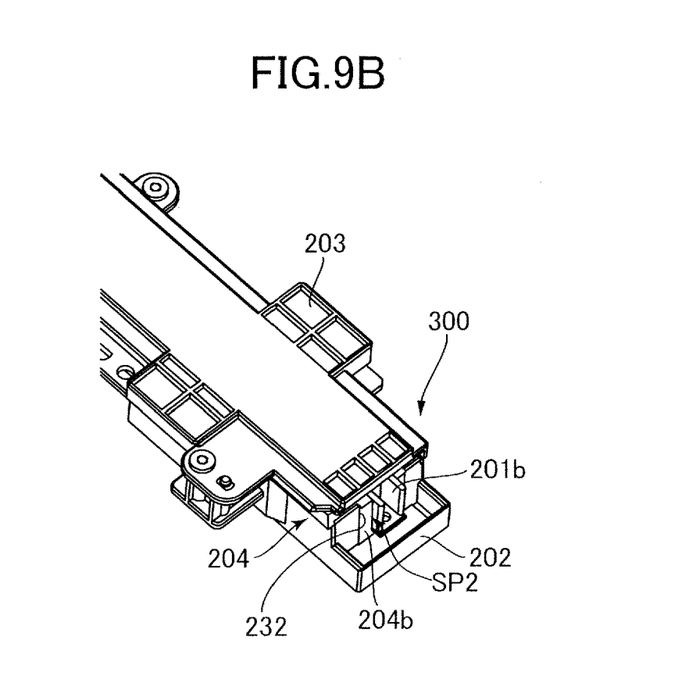
FIG. 9B is a perspective view illustrating the projecting portion of the second reading unit and the elastic member.

As illustrated in FIGS. 9A and 9B, the elastic portion 204 is pressed by the first case member 202 and the second case member 203, and it is collapsed for a predetermined amount even before performing adjustment of position of the second reading unit 201. That is, the elastic portion 204 is arranged to fill the area where the second reading unit 201 is not present in the opening portions 231 and 232 of the case 300 formed of the first case member 202 and the second case member 203. Therefore, the case 300 pivotably stores the second reading unit 201 to allow movement of the projecting portion 201b of the second reading unit 201 within a predetermined range in the opening portion 232. In this state, if the projecting portion 201b of the second reading unit 201 pivots, the second elastic member 204b constituting a portion of the elastic portion 204 deforms while following a pivoting locus of the projecting portion 201b, and the sealed state of the sealed unit 200 composed of the first case member 202, the second case member 203 and the elastic portion 204 is maintained. That is, the elastic portion 204 allows movement of the projecting portion 201b and deforms while maintaining the sealed state of the second reading unit 201. Thereby, the position of the second reading unit 201 can be adjusted while maintaining the sealed state of the second reading unit 201 by the sealed unit 200, and reading accuracy of the document is improved. Moreover, the reading accuracy is also improved by preventing foreign substances from entering the area between the second reading unit 201 and the transparent portion 209. Furthermore, the position of the second reading unit 201 is adjusted easily.

In the present embodiment, the opening portion 231 through which the first end 221 of the second reading unit 201 passes is formed on the first end of the first case member 202, and an engagement hole 201a configured to engage with the shaft portion 205 is arranged on an outer side of the first case member 202. This arrangement is adopted to minimize the amount of variation of angle of the second reading unit 201 with respect to the amount of movement of the adjusting lever, by elongating a distance between the center of pivot and the adjusting lever 206 used to adjust the position of the second reading unit 201. However, it is also possible to arrange the center of pivot for adjusting the position of the second reading unit 201 on an inner side of the first case member 202.

Second Embodiment

Next, a second embodiment of the present invention will be illustrated, wherein the components similar to the first embodiment are either not illustrated or assigned with the same reference numbers.

Figure 10:
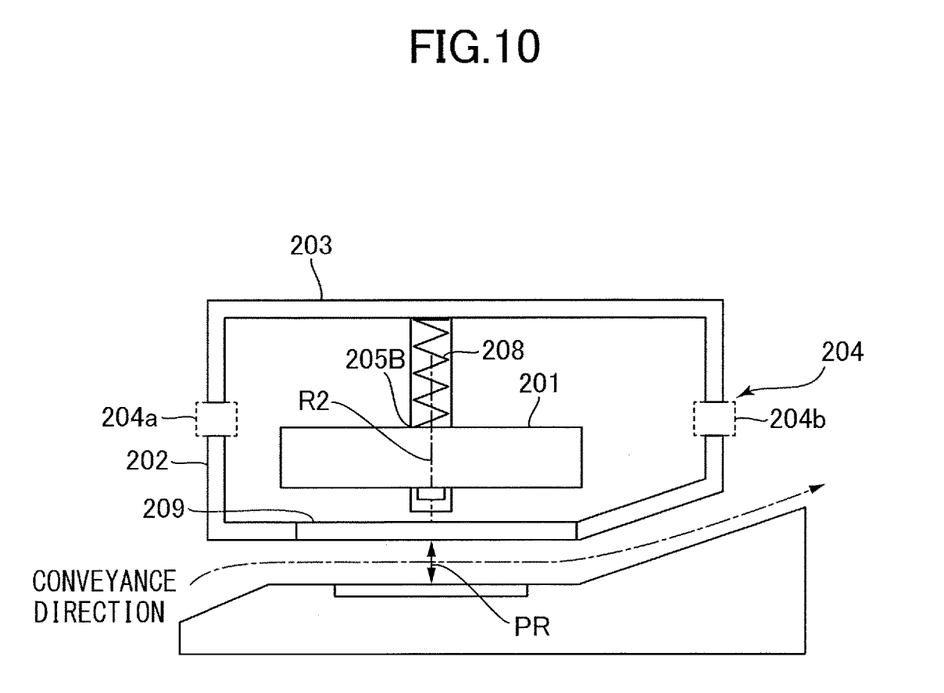
FIG. 10 is a side view illustrating a second reading unit and a sealed unit according to a second embodiment.

The second case member 203 includes the shaft portion 205B projecting downward, as illustrated in FIG. 10, and the second reading unit 201 is supported pivotably with respect to the shaft portion 205B. The center line R2 of the shaft portion 205B is positioned on the image reading line R1 (refer to FIG. 7), similar to the first embodiment. Therefore, the adjustment of position of the second reading unit 201 can be completed easily by matching the adjustment angle of the second reading unit 201 with the skewed angle of the document D being conveyed.

According to the first and second embodiments described above, the elastic portion 204 is designed to be sandwiched between the first case member 202 and the second case member 203, but other arrangements can also be adopted. For example, it is possible to form an opening through which the projecting portion 201b of the second reading unit 201 can enter on one sealed member, and to press-fit the elastic member to this opening.

Further according to the first and second embodiments, the center line R2 serving as the center of pivot of the second reading unit 201 is not necessary on the image reading line R1, and the positions of the shaft portions 205 and 205B and the engagement hole 201a are not restricted. Of course, not only the second reading unit 201 but also other members such as the first unit 151 can be sealed in the sealing portion.

According further to the first and second embodiments, the first reading unit 151 and the second reading unit 201 can use a CCD (Charge Coupled Device) instead of the CIS for the first reading unit 151 and the second reading unit 201. Further, the image reading apparatus 103 can be adopted in various image forming apparatus such as copying machines, facsimiles, printers, and multifunction machines, or it can be used alone.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2016-101054, filed May 20, 2016, which is hereby incorporated by reference wherein in its entirety.

What is claimed is:

1. An image reading apparatus comprising:
a case comprising a transparent portion and a portion defining an opening;
a reading unit comprising a photodetector disposed in the case and configured to read an image information on a sheet by photoelectric-converting a light through the transparent portion, and a support member configured to support the photodetector, the support member comprising a projecting portion configured to project outward from the case through the opening; and
an elastic portion provided to fill the opening together with the support member,
wherein the projecting portion is movable in the opening while deforming the elastic portion, and
the photodetector supported by the support member moves within the case in a case where the projecting portion moves in an outside of the case.

2. The image reading apparatus according to claim 1, wherein the case comprises a first case member having the transparent portion, and a second case member storing the photodetector together with the first case member.

3. The image reading apparatus according to claim 2, wherein at least one of the first case member and the second case member pivotably support the support member.

4. The image reading apparatus according to claim 3, wherein the photodetector comprises a sensor array arranged in a predetermined direction, and
a center of pivot of the support member is arranged to intersect an extended line in the predetermined direction of the sensor array.

5. The image reading apparatus according to claim 4, wherein the center of pivot is arranged at a first end of the support member in the predetermined direction, and
the projecting portion is arranged at a second end of the support member in the predetermined direction.

6. The image reading apparatus according to claim 5, wherein the opening is a first opening,
the elastic portion is a first elastic member, and
the case comprises a portion defining a second opening through which the first end of the support member is projected outward from the case,
the image reading apparatus further comprising a second elastic member provided to fill the second opening together with the first end of the support member.

7. The image reading apparatus according to claim 2, wherein the elastic portion is pressed by the first case member and the second case member in a state where the case is storing the photodetector.

8. The image reading apparatus according to claim 2, wherein the support member is supported by the first case member,
the image reading apparatus further comprising a biasing portionconfigured to bias the support member toward the first case member and arranged between the second case member and the support member.

9. The image reading apparatus according to claim 2, wherein the first case member comprises a guide portion configured to guide a sheet being conveyed.

10. The image reading apparatus according to claim 1, further comprising an adjustment portion configured to engage with the projecting portion and adjust a position of the photodetector.

11. The image reading apparatus according to claim 10, further comprising a supporting portion supporting the case, wherein the support member is fixed to the supporting portion after the position of the photodetector is adjusted by the adjustment portion.

12. The image reading apparatus according to claim 1, wherein the elastic portion is made of a foamed material.

13. The image reading apparatus according to claim 1, wherein the reading unit comprises a light emitting element configured to emit light toward a sheet, and
the photodetector receives the light emitted from the light emitting element and reflected on the sheet.

14. The image reading apparatus according to claim 1, further comprising a sheet feeding unit configured to feed a sheet,
wherein the case is fixed to the sheet feeding unit.

15. The image reading apparatus according to claim 14, further comprising a body unit comprising a reading portion configured to read an image information on a first side of a sheet being conveyed, the body unit configured to support the sheet feed unit in an openable and closable manner,
wherein the photodetector is configured to read an image on a second side opposite to the first side of the sheet.

16. An image forming apparatus comprising:
the image reading apparatus according to claim 1; and
an image forming portion configured to form an image on a recording medium based on an image information read by the image reading apparatus.

17. An image reading apparatus comprising:
a sealed unit comprising a deforming portion and a transparent portion, and being formed to seal an inside of the sealed unit and
a reading unit comprising a photodetector disposed in the sealed unit and configured to read an image information on a sheet by photoelectric-converting a light through the transparent portion, and a support member configured to support the photodetector, the support member comprising a projecting portion configured to project outward from the sealed unit,
wherein the photodetector supported by the support member moves within the sealed unit in a case where the projecting portion moves in an outside of the sealed unit and
the projecting portion is movable while deforming the deforming portion which maintains a sealed state of the sealed unit.

18. An image forming apparatus comprising:
the image reading apparatus according to claim 17; and
an image forming portion configured to form an image on a recording medium based on an image information read by the image reading apparatus.

* * * * *